(12) United States Patent
Schaefer et al.

(10) Patent No.: US 10,141,729 B2
(45) Date of Patent: Nov. 27, 2018

(54) SELF SECURING CABLE JACKET—CABLE BULK WIRE WITH JACKET INCORPORATED ROUTING RETENTION FEATURES

(71) Applicant: International Business Machines Corporation, Armonk, NY (US)

(72) Inventors: Paul W. Schaefer, Rochester, MN (US); Sandra J. Shirk/Heath, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 2 days.

(21) Appl. No.: 15/461,117

(22) Filed: Mar. 16, 2017

(65) Prior Publication Data

US 2018/0269667 A1    Sep. 20, 2018

(51) Int. Cl.
*H02G 3/04* (2006.01)
*H01B 7/02* (2006.01)
*H01B 13/14* (2006.01)

(52) U.S. Cl.
CPC ......... *H02G 3/0456* (2013.01); *H01B 7/0275* (2013.01); *H01B 13/14* (2013.01)

(58) Field of Classification Search
CPC .......... H02G 3/0456; H02G 3/00; H02G 3/02; H02G 3/04; H02G 3/0431; H02G 3/0437; H02G 3/0462; H02G 3/22; H01B 7/0275; H01B 13/14; H01B 7/02
USPC ...... 174/68.1, 72 A, 74 R, 70 R, 73.1, 70 C; 248/68.1, 49
See application file for complete search history.

(56) References Cited

U.S. PATENT DOCUMENTS

| | | | | |
|---|---|---|---|---|
| 3,458,650 | A * | 7/1969 | Miyawaki | H01F 19/08 174/113 R |
| 5,359,150 | A * | 10/1994 | Ikeuchi | H01B 7/0853 174/117 A |
| 5,669,590 | A * | 9/1997 | Przewodek | H02G 3/32 248/68.1 |
| 5,703,330 | A * | 12/1997 | Kujawski | B60R 16/0215 248/68.1 |
| 5,906,507 | A * | 5/1999 | Howard | H02G 11/00 174/135 |
| 6,380,485 | B1 * | 4/2002 | Beaman | H01R 13/6588 174/88 R |
| 6,584,267 | B1 | 6/2003 | Caveney et al. | |

(Continued)

FOREIGN PATENT DOCUMENTS

WO    2008130717 A2    10/2008

OTHER PUBLICATIONS

Schneider Electric, "Enclosure and Rack Systems Cable Management", apcmedia.com, 2013.

*Primary Examiner* — Angel R Estrada
(74) *Attorney, Agent, or Firm* — Patterson + Sheridan, LLP (57) ABSTRACT

Embodiments of the present disclosure generally relate to cables having routing features integrated with a jacket of the cable, and methods of using and forming the same. The routing features include one or more of hook-and-loop fasteners or clips for securing adjacent cables to one another and/or to a mounting structure, such as a server rack. Methods described herein include securing cables to one another using routing retention features integrated with cable jackets, and forming jackets having routing retention features.

7 Claims, 9 Drawing Sheets

(56) References Cited

U.S. PATENT DOCUMENTS

| | | | |
|---|---|---|---|
| 6,752,426 B2* | 6/2004 | Kacines | B60T 17/046 |
| | | | 174/72 A |
| 6,909,050 B1* | 6/2005 | Bradford | H01B 7/40 |
| | | | 174/110 R |
| 7,049,523 B2* | 5/2006 | Shuman | H02G 3/0487 |
| | | | 174/113 R |
| 7,480,154 B2 | 1/2009 | Lawrence et al. | |
| 8,083,537 B2* | 12/2011 | Sakata | H02G 3/32 |
| | | | 174/78 |
| 8,507,794 B2* | 8/2013 | Wada | H02G 3/32 |
| | | | 248/68.1 |
| 8,590,846 B2* | 11/2013 | Guthke | H02G 3/30 |
| | | | 248/68.1 |
| 8,870,131 B2* | 10/2014 | Gotou | H02G 3/32 |
| | | | 174/72 A |
| 8,975,514 B2* | 3/2015 | Groset | H01B 7/292 |
| | | | 174/36 |
| 9,165,698 B2* | 10/2015 | Runzel, IV | H01B 7/009 |
| 9,291,791 B2 | 3/2016 | Sievers et al. | |
| 2004/0065787 A1 | 4/2004 | Hardt et al. | |
| 2007/0232134 A1 | 10/2007 | Desrochers et al. | |

\* cited by examiner

SELF SECURING CABLE JACKET—CABLE BULK WIRE WITH JACKET INCORPORATED ROUTING RETENTION FEATURES

BACKGROUND

Field

Embodiments of the present disclosure generally relate to cables having routing features integrated with a jacket of the cable.

Description of the Related Art

Many applications utilize a plurality of cables for routing information, including computers, servers, home audio, and the like. Users may wish to bundle cables to improve aesthetics or to improve accessibility to hardware. Conventional techniques for securing cables include brackets with plastic clips, bridge lances, cables ties, or combinations thereof. Due to the limited space in areas where cables are generally positioned, it is often difficult to secure cables using conventional techniques. In particular, release fingers, levers, cable ties, and screws are restricted from access by servicing personnel.

Therefore, there is a need for new methods and apparatus for securing cables.

SUMMARY

Embodiments of the present disclosure generally relate to cables having routing features integrated with a jacket of the cable, and methods of using and forming the same. The routing features include one or more of hook-and-loop fasteners or clips for securing adjacent cables to one another and/or to a mounting structure, such as a server rack. Methods described herein include securing cables to one another using routing retention features integrated with cable jackets, and forming jackets having routing retention features.

In one aspect, a cable comprises one or more filaments; and a jacket surrounding the one or more filaments, the jacket having a routing retention feature integrally formed therewith.

In another aspect, a cable comprises one or more filaments; and an electrically-insulating jacket surrounding the one or more filaments, the jacket having a routing retention feature integrally formed therewith.

In another aspect, a method of forming of cable comprises disposing a jacket around one or more filaments, the jacking including a routing retention feature integrally formed therewith.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments of the present disclosure generally relate to cables having routing features integrated with a jacket of the cable, and methods of using and forming the same. The routing features include one or more of hook-and-loop fasteners or clips for securing adjacent cables to one another and/or to a mounting structure, such as a server rack. Methods described herein include securing cables to one another using routing retention features integrated with cable jackets, and forming jackets having routing retention features.

Figure 1A:
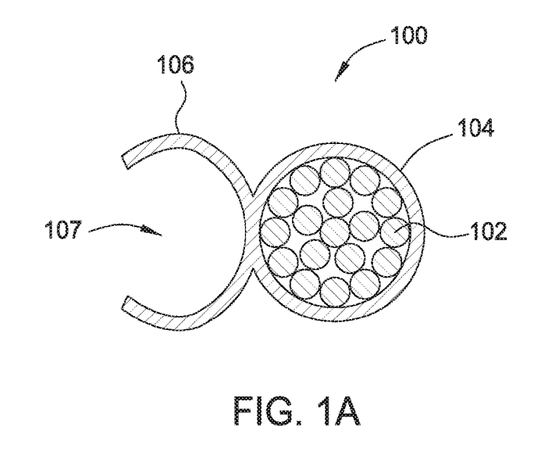
FIG. 1A is a schematic view of a cable having a routing retention feature, according to one aspect of the disclosure.

FIG. 1A is a schematic view of a cable 100 having a routing retention feature, according to one aspect of the disclosure. The cable 100 includes one or more filaments 102 surrounded by a jacket 104. The filaments 102 are formed from an electrically conductive material, such as copper, or alternatively, of a fiber optic material. The jacket 104 is formed from an electrically insulating material, such as rubber. For example, the jacket 104 may be formed from silicon rubber, thermoset rubber, or ethylene propylene diene monomer rubber, or other materials such as polyvinyl chloride. Optional electrically insulating material (not shown) may be disposed between the filaments 102 and the jacket 104. It is contemplated that individual filaments 102 may include a filament-specific jacket to provide isolation therebetween. The jacket 104 includes one or more routing retention features, such as a clip 106, integrally formed therewith. The clip 106 is coupled to or formed as part of the jacket 104 material during formation of the cable 100. For example, the jacket 104 and the clip 106 may be formed simultaneously in an extrusion process. Thus, in such an example, the clip 106 is formed from the same material as the jacket 104. However, it is contemplated that other materials, such as rigid plastics, may be utilized for formation of the clip 106.

The clip 106 is C-shaped and has a curved, semi-circular, or semi-ovular shape. In one example, the clip 106 spans about 220 degrees to about 260 degrees, and has an internal diameter about equal to, or slightly less than (e.g., within 10 percent), that of the outside diameter of the jacket 104. The clip 106 includes an opening 107 to engage a corresponding cable. The clip 106 maintains the corresponding cable therein via one or more of inward tension applied by the clip 106, an interference fit, or friction. The cable 100 may include a plurality of clips 106, axially and/or radially spaced from one another.

Figure 1B:
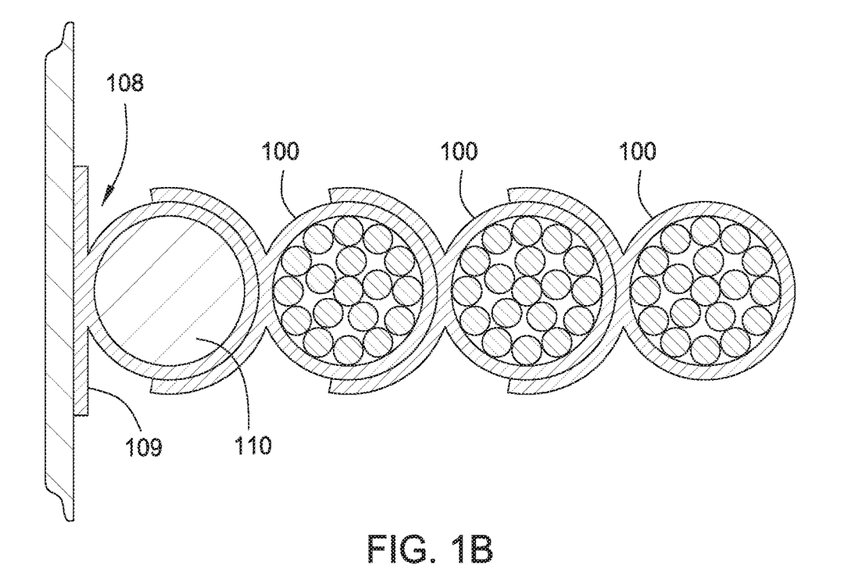
FIGS. 1B-1D illustrate a plurality of cables in a mounted configuration, according to aspects of the disclosure.
Figure 1C:
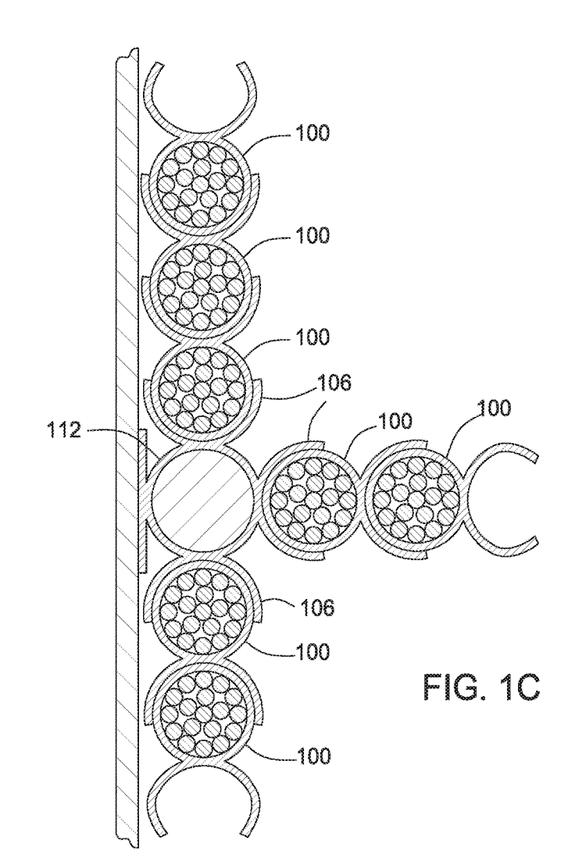
Figure 1D:
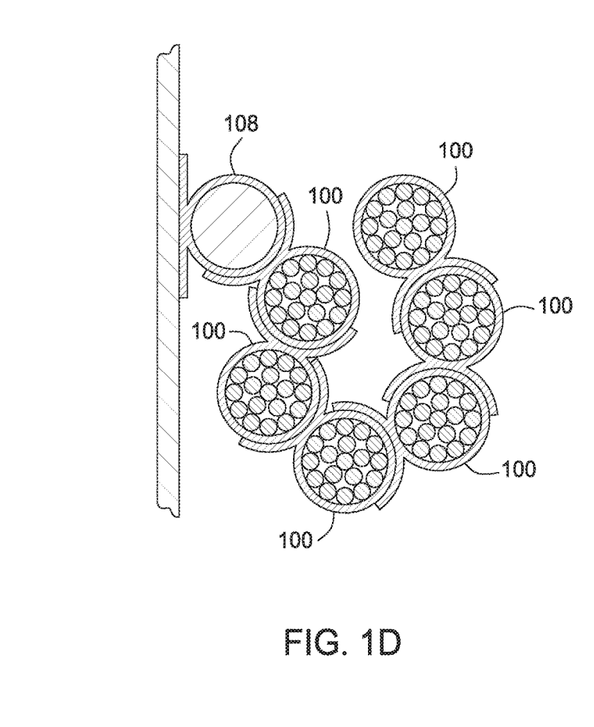

FIGS. 1B-1D illustrate a plurality of cables 100 in a mounted configuration. FIG. 1B illustrates three cables 100 mounted in a linear configuration to an attachment device 108. The attachment feature is mechanical element having a mounting bracket 109 and an engagement feature 110. The mounting bracket 109 is configured to be secured to a surface, such as a server rack or other element, to provide a mounting location for a cable 100. The engagement feature 110 of the attachment device 108 is a cylindrical length of material sized to receive and maintain a clip 106 of a cable 100, thereby securing the cable 100 to the attachment device. The attachment device 108 is constructed from one or more of metal, rubber, plastic, or a combination thereof. As shown in FIG. 1B, once a first cable 100 is secured to the attachment device 108, additional cables 100 may then successively be secured to the first mounted cable 100, thereby maintaining the cables 100 in a secured or bundled configuration.

FIG. 1C illustrates an alternative mounting arrangement, according to another aspect of the disclosure. FIG. 1C is similar to FIG. 1B, however, the example shown in FIG. 1C includes a three-way mounting device 112, rather than a single direction attachment device 108. The three way mounting device 112 includes an engagement feature 110 having a plurality of clips 106 (three are shown) extending therefrom. The inclusion of multiple clips 106 increases the number of cables 100 that can be directly coupled to the mounting device 112, while also increasing orientation flexibility.

FIG. 1D illustrates cables 100 mounted to an attachment device 108 in an alternative arrangement. In FIG. 1D, six cables 100 are bundled together in a non-linear arrangement. The non-linear arrangement improves bundling in space-constrained locations. The degree of non-linearity is dictated by the size of the opening 107 (shown in FIG. 1A) in the clip 106, or by the width of the interface of the clip 106 and the jacket 104.

Figure 2A:
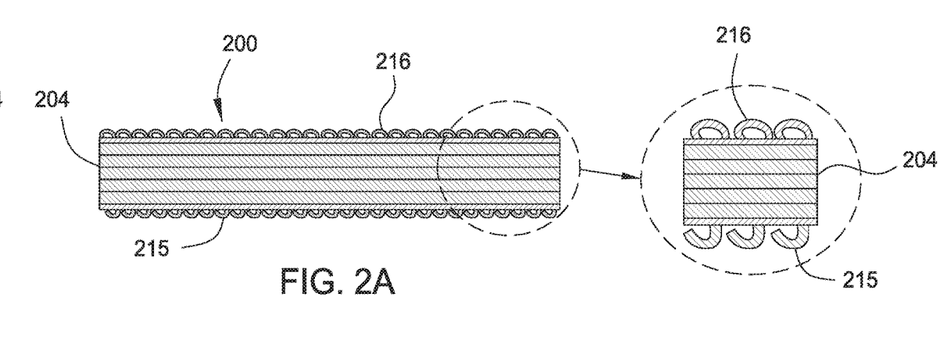
FIGS. 2A and 2B are schematic views of a cable having a routing retention feature, according to another aspect of the disclosure.

FIG. 2A is a schematic view of a cable 200 having a routing retention feature, according to another aspect of the disclosure. The cable 200 is similar to the cable 100 described above; however, the cable 200 utilizes hook-and-loop fasteners as routing retention features. As shown in FIG. 2A, hooks 215 and loops 216 are coupled to or formed as part of the jacket 204 of the cable 200. In one example, the hooks 215 and the loops 216 in formed simultaneously with the jacket 204, such as in an extrusion process. Alternatively, the hooks 215 and the loops 216 are secured to the jacket 204 exterior after formation of the jacket 204. In such an example, the hooks 215 and the loops 216 may be secured using a bonding agent, such as glue, epoxy, or the like, or the hooks 215 and the loops 216 may be secured by sonic welding.

Figure 2B:
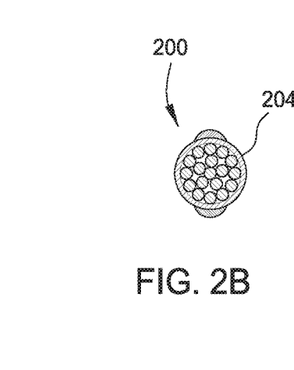

FIG. 2B is a sectional view of the cable 200. As shown in FIG. 2B, the jacket 204 of the cable 200 includes both hooks 215 and loops 216 disposed over surfaces thereof. In one example, the hooks 215 are disposed on a first side of the jacket 204, while the loops 216 are disposed on a second side opposite the first side. In the embodiment of FIG. 2B, each of the hooks 215 and the loops 216 may cover about equal surface areas of the jacket 204, such as about 5 percent to about 25 percent, or may cover a width of about 18 degrees to about 90 degrees. In the embodiment of FIG. 2B, the hooks 215 and the loops 216 run axially along the cable 200, and may span the length of the cable 200.

Figure 2C:
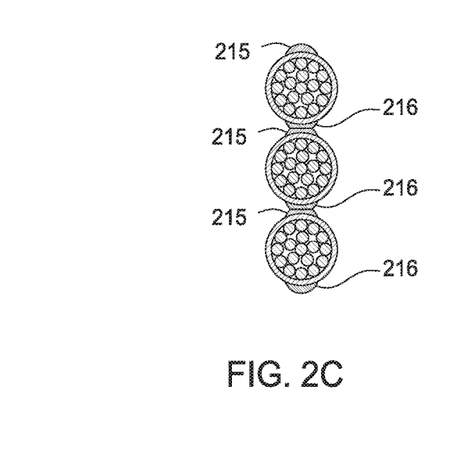
FIGS. 2C and 2D are schematic views of multiple cables coupled together, according to one aspect of the disclosure.
Figure 2D:
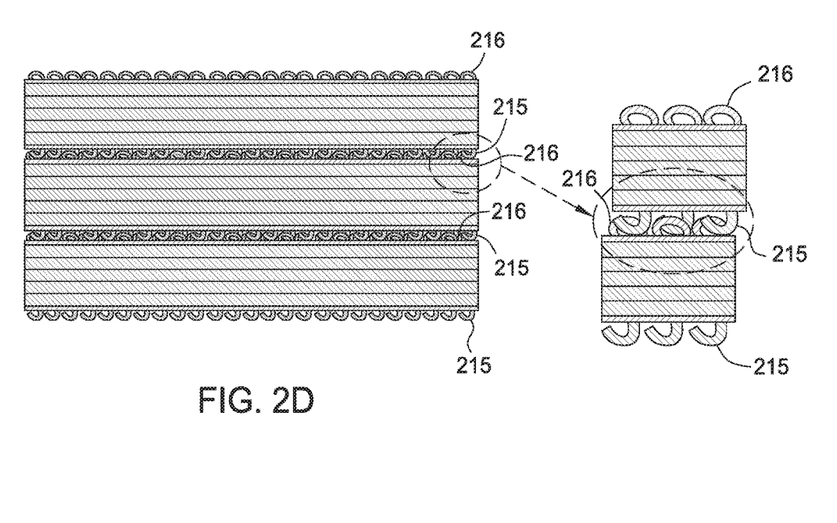
Figure 2E:
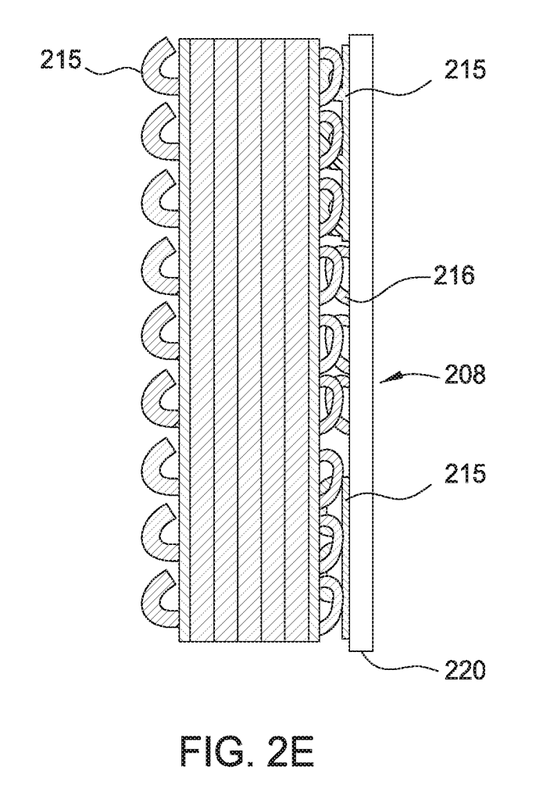
FIG. 2E illustrates coupling of a cable to a mounting feature, according to one aspect.

FIGS. 2C and 2D are schematic views of multiple cables 200 coupled together. FIG. 2C illustrates a section view of the cables 200, while FIG. 2D illustrates a plan view of the cables 200. While FIGS. 2C and 2D illustrate three cables 200, it is contemplated that two or more cables 200 may be coupled together. The cables 200 are positioned such that the hooks 215 of a first cable 200 engage the loops 216 of an adjacent cable 200 to facilitate hook-to-loop fastening, thereby coupling adjacent cables 200. FIG. 2E illustrates coupling of a cable 200 to a mounting feature 208. The mounting feature 208 includes alternating sections of hooks 215 and loops 216, which are mounted onto a surface 220. In one example, the surface 220 is a wall of a server rack. The use of alternating hook and loop sections increases mounting flexibility by allowing either a cable 200 having hooks 215 or loops 216 to be mounted thereto.

Figures 3A, 3B:
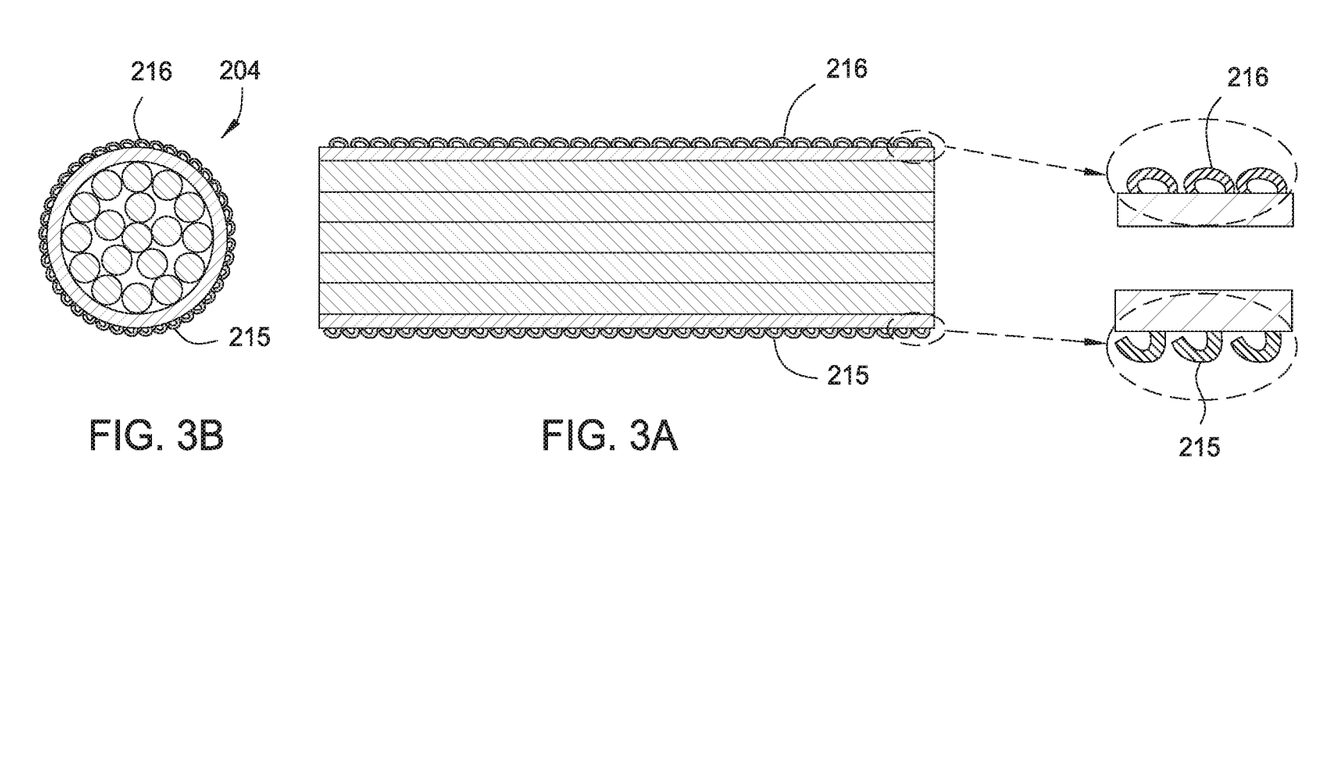
FIGS. 3A and 3B are schematic views of a cable having a routing retention feature, according to another aspect of the disclosure.

FIGS. 3A and 3B are schematic views of a cable 300 having a routing retention feature, according to another aspect of the disclosure. The cable 300 is similar to the cable 200 described above, however, the hooks 215 and the loops 216 together extend around the entire circumference of the cable 300. In one example, the hooks 215 and the loops 216 may extend the entire length or almost the entire length of the cable 300. The increased surface area covered by the hooks 215 and the loops 216 increases the ease of adhering adjacent cables 300. In one example, the hooks 215 and the loops 216 proportionately cover the cable 300. In another example, the hooks 215 and the loops 216 disproportionately cover the cable 300.

Figure 4A:
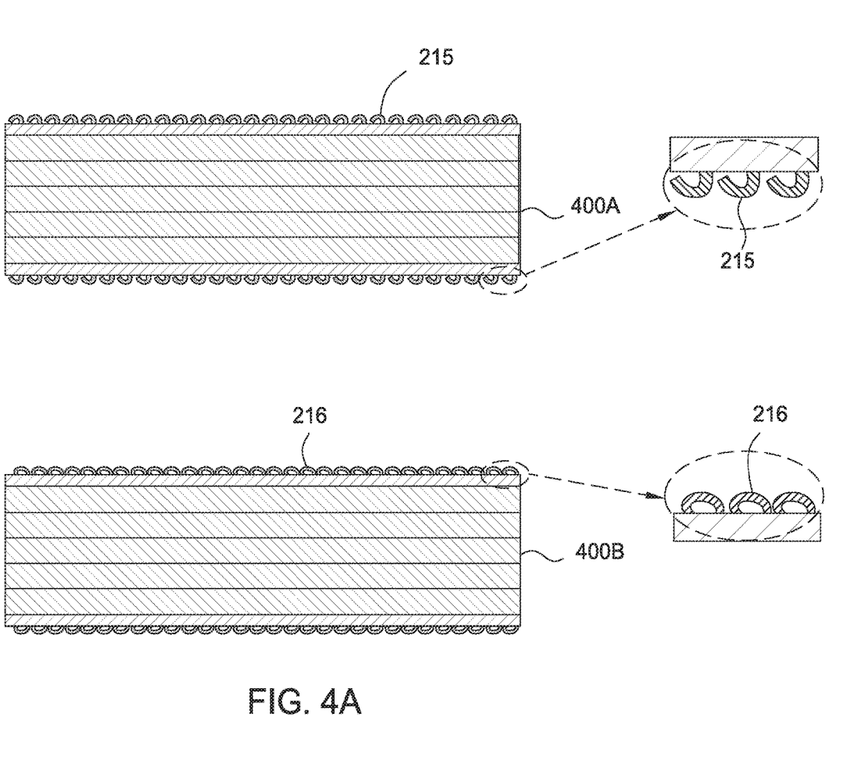
FIGS. 4A and 4B are schematic views of cables having a routing retention feature, according to another aspect of the disclosure.
Figure 4B:
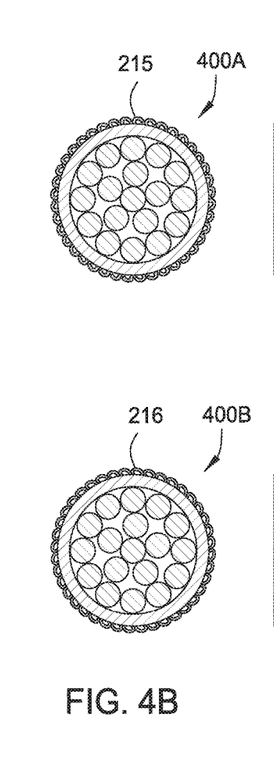

FIGS. 4A and 4B are schematic views of cables 400A, 400B having a routing retention feature, according to another aspect of the disclosure. The cables 400A, 400B are similar to cables 200 and 300 described above, however, each of cables 400A, 400B includes only a single routing retention feature thereon. In the illustrated example, cable 400A includes hooks 215 disposed thereon, and cable 400B includes loops 216 disposed thereon. The hooks 215 and the loops 216 may be disposed over all or most of the surface area of a respective cable 400A, 400B, or may be disposed in discrete increments. When disposed in discrete increments, the intervals may be spaced axially, radially, or both.

Figures 5A, 5B, 5C:
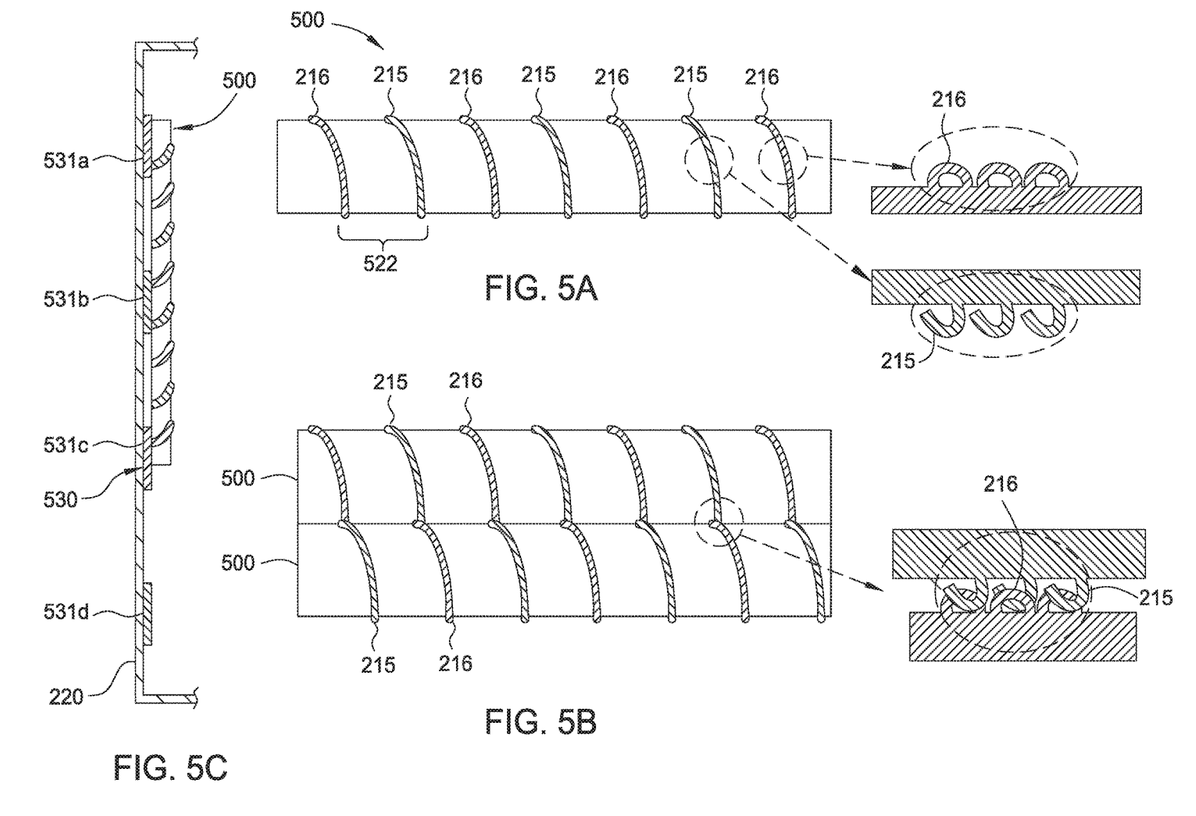
FIGS. 5A-5C are schematic views of a cable having a routing retention feature, according to another aspect of the disclosure.

FIGS. 5A-5C are schematic views of a cable 500 having a routing retention feature, according to another aspect of the disclosure. The cable 500 is similar to cables 200 and 300 described above, however, the cable 500 includes hooks 215 and loops 216 disposed axially along the length of the cable 500 in an alternating configuration. The hooks 215 and the loops 216 may be configured in a double helix configuration, or a single helix configuration including alternating hook and loop sections along the length thereof. Alternatively, the hooks 215 and the loops 216 may be disposed in alternating, axially-aligned rings or ring segments. The hooks 215 and the loops 216 are separated from one another by a space 522. In one example, the space 522 is cable jacket material without a routing retention feature (e.g., hooks 215 or loops 216) thereon, and may span a distance of about 1 inch to about 2 inches. The inclusion of the space 522 reduces the surface area covered by the hooks 215 and the loops 216, thereby reducing jacket bulk. It is contemplated that the hooks 215 and the loops 216 may be formed at the time of jacket manufacturing, such as by molding or extrusion, and thus, the hooks and loops 216 are integral with the jacket material. Alternatively, the hooks 215 and the loops 216 may be adhered to the jacket after the jacket is extruded.

FIG. 5B illustrates two cables 500 coupled together. The hooks 215 and loops 216 of a first cable 500 are positioned to engage the hooks 215 and the loops of a second cable 500. The alternating configuration of the hooks 215 and the loops 216 of each cable facilitates ease of inter-cable coupling by increasing the likelihood of hook/loop engagement, particularly in confined locations.

FIG. 5C illustrates a cable 500 coupled to a surface 220 via an attachment device 530. The attachment device includes one or more pads 531a-531d (four are shown) disposed on the surface 220. The pads 531a-531d include one or both of hooks 215 or loops 216 to engage corresponding hooks 215 or loops 216 of the cables 500, thereby securing the cables against the pads 531a-531d and thus, securing the cables 500 to the surface 220. It is contemplated that the pads 531a-531d may be sized to accommodate coupling with a desired number of cables 500, or that sizing of the pads 531a-531d may be influenced by the dimensions of the surface 220.

Figure 6A:
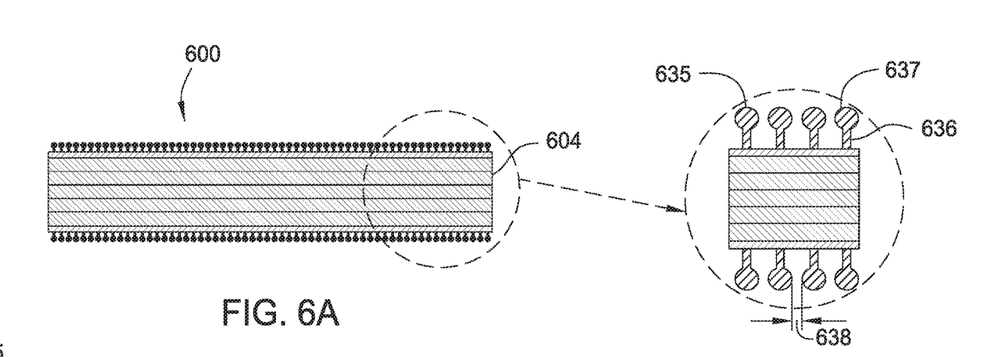
FIGS. 6A-6C are schematic views of cables having routing retention features, according to another aspect of the disclosure.
Figure 6B:
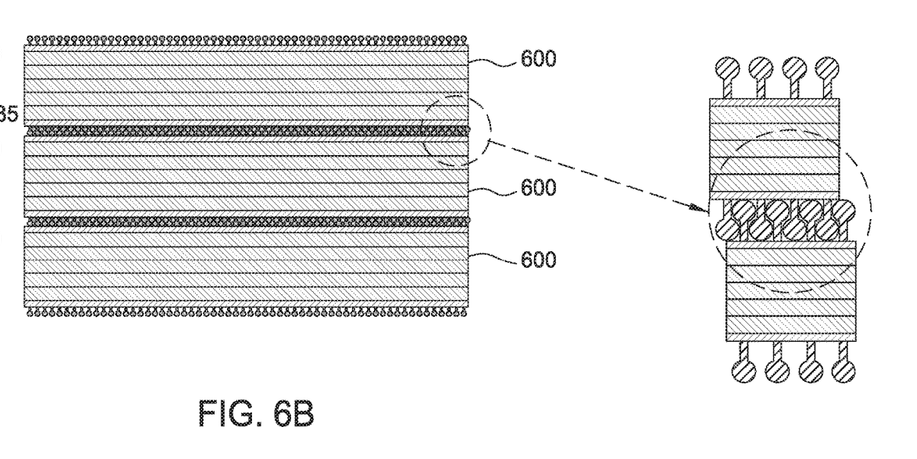
Figure 6C:
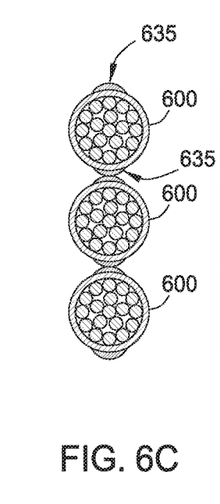

FIGS. 6A-6C are schematic views of cables 600 having routing retention features, according to another aspect of the disclosure. The routing retention features of cable 600 include a plurality of posts 635 extending perpendicularly from a tangent at a surface of a jacket 604 of the cable 600. The posts 635 include a base 636 having a bulbous cap 637 positioned at a distal end thereof. In one example, the base 636 is a cylindrical column, and the bulbous cap 637 is a spherical member. The posts 635 are spaced from one another to create a distance 638 between adjacent bulbous caps 637. The distance 638 is less than a diameter of a bulbous cap 637.

FIG. 6B illustrates coupling of cables 600 via respective routing retention features. As illustrated in FIG. 6B, posts 635 of adjacent cables 600 engage one other to create an interference fit. The bulbous caps 637 of a first cable 600 are positioned between base 636 and under the bulbous caps 637 of a second cable 600. The bulbous caps 637 of the second cable are correspondingly positioned with respect to the posts 635 of the first cable 600, thus creating the interference fit. The interference fit of the posts 635 secures the cables 600 to one another, but, due to the flexible material from which posts 635, the posts 635 may be selectively disengaged to allow separation. The size of the posts 635 may be selected to provide a desired number of engagements per unit surface area of a cable 600. It is contemplated that the posts 635 may be formed during production of the jacket 604, such as during extrusion of molding, or that the posts 635 maybe secured to or milled/stamped into the jacket 604 after formation of the jacket 604.

FIG. 6C illustrates a side view of cables 600 during engagement. As illustrated in FIG. 6C, the posts 635 are formed at desired locations on the cables 600. The posts 635 are positioned in arrays along the jacket 604, and are axially separated by spaces 622. Each array includes a plurality of posts 635 in a first direction and plurality of posts in a second, perpendicular, direction. In one example, centers of the arrays of posts 635 are positioned about 180 degrees from one another. However, it is contemplated that more than two arrays of posts may be positioned on the jacket 604. For example, the cable 600 may include four arrays of posts 635 arranged about 90 degrees from one another. Other configurations, including equal an unequal spacing between arrays, or other numbers of arrays, is contemplated. In one example, each array of posts 635 may have a width of about 3 degrees to about 90 degrees, such as about 3 degrees to about 45 degrees or about 5 degrees to about 15 degrees. In another example, almost the complete exterior of the jacket 604 may be covered with posts 635.

Figure 7A:
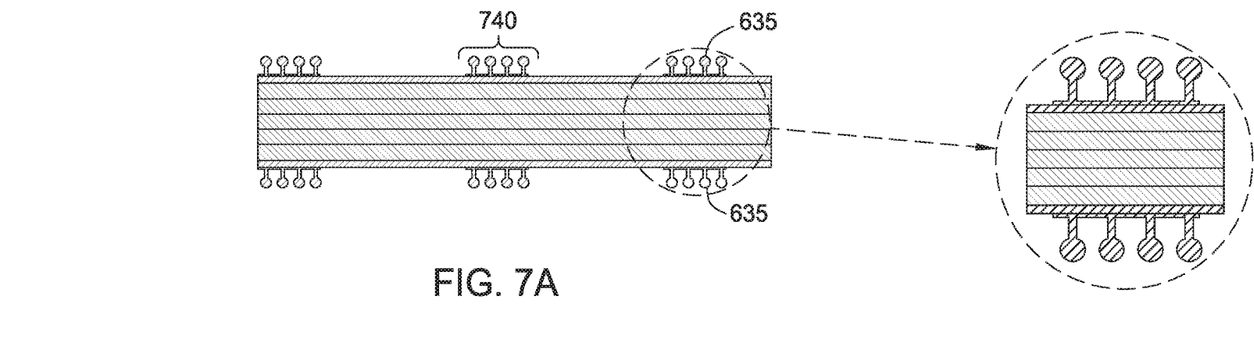
FIG. 7A is schematic view of a cable having routing retention features, according to another aspect of the disclosure.

FIG. 7A is schematic view of a cable 700 having routing retention features, according to another aspect of the disclosure. The cable 700 is similar to the cable 600. However, the posts 635 of the cable 700 are arranged in axially-spaced groups 740. The axially-spaced groups 740 reduce the number of posts formed on the cable 700, thereby reducing jacket bulk. In the example of FIG. 7A, the axially-spaced groups 740 are radially aligned. In one example, an axially-spaced group 740 may extend about 5 degrees to about 360 degrees around the cable 700. In another example, one or more groups 740 may be positioned at each axial position. For example, two groups 740 may be positioned at an axial location. Each of the groups may be radially aligned, having centers at about 180 degrees from one another.

Figure 7B:
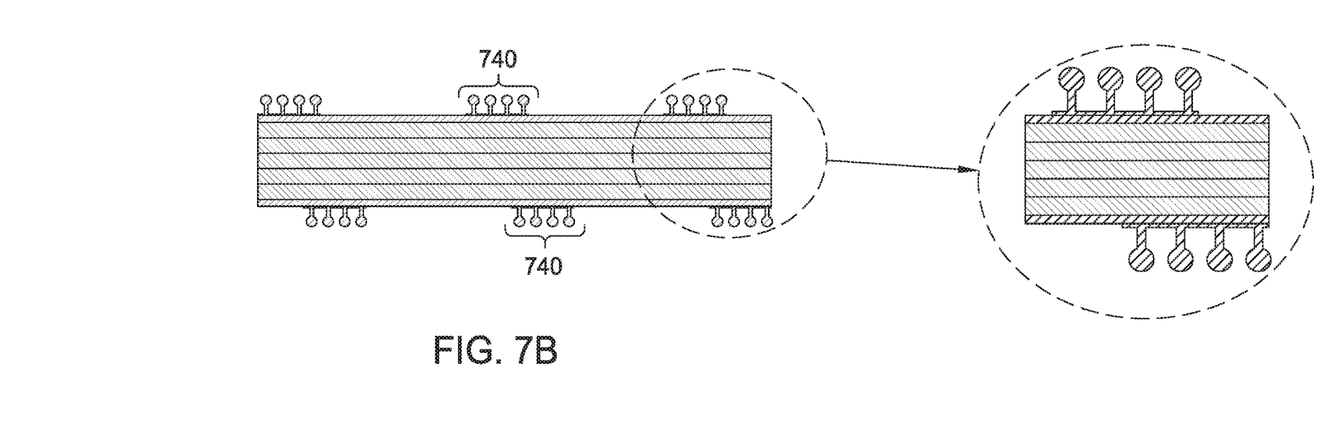
FIG. 7B is schematic view of a cable having routing retention features, according to another aspect of the disclosure.

FIG. 7B is schematic view of a cable 800 having routing retention features, according to another aspect of the disclosure. The cable 800 is similar to the cable 700. However, the groups 740 of the cable 800 are radially offset from one another along the axial length of the cable 800. The groups 740 may be radially offset from one another by about 10 percent to about 90 percent of the total axial length of a group 740. It is contemplated that the radial offset facilitates coupling of cables 800 to one another, particularly when the cables 800 are not aligned due to routing length differences between cables 800.

Benefits of the disclosure include easier bundling of cables. Due to inclusion of integral routing retention features, separate fasteners or other securing members are unnecessary.

While the foregoing is directed to embodiments of the present disclosure, other and further embodiments of the disclosure may be devised without departing from the basic scope thereof, and the scope thereof is determined by the claims that follow.

What is claimed is:

1. A cable, comprising:
   one or more filaments; and
   a cable jacket surrounding the one or more filaments, the cable jacket having a routing retention feature integrally formed therewith;
   wherein the routing retention feature includes a C-shaped clip extending from the cable jacket and formed about a center; and
   wherein the C-shaped clip spans between about 220 degrees and about 260 degrees circumferentially about the center of the C-shaped clip.

2. The cable of claim 1, further comprising additional C-shaped clips axially spaced from one another.

3. The cable of claim 1, wherein the cable jacket comprises silicon rubber, thermoset rubber, or ethylene propylene diene monomer rubber.

4. A cable, comprising:
   one or more filaments; and
   an electrically-insulating cable jacket surrounding the one or more filaments, the cable jacket having a routing retention feature integrally formed therewith;

wherein the routing retention feature includes a C-shaped clip extending from the cable jacket and formed about a center; and wherein the C-shaped clip spans between about 220 degrees and about 260 degrees circumferentially about the center of the C-shaped clip.

5. The cable of claim 4, wherein the cable jacket comprises silicon rubber, thermoset rubber, or ethylene propylene diene monomer rubber.

6. A method of forming of cable, comprising:

disposing a cable jacket around one or more filaments, the cable jacket including a routing retention feature integrally formed therewith;

wherein the routing retention feature includes a C-shaped clip extending from the cable jacket and formed about a center; and wherein the C-shaped clip spans between about 220 degrees and about 260 degrees circumferentially about the center of the C-shaped clip.

7. The method of claim 6, wherein the routing retention feature is formed during an extrusion process of the cable jacket.

* * * * *